Nov. 22, 1938.     G. A. TINNERMAN     2,137,929
TOOL
Filed Aug. 31, 1937
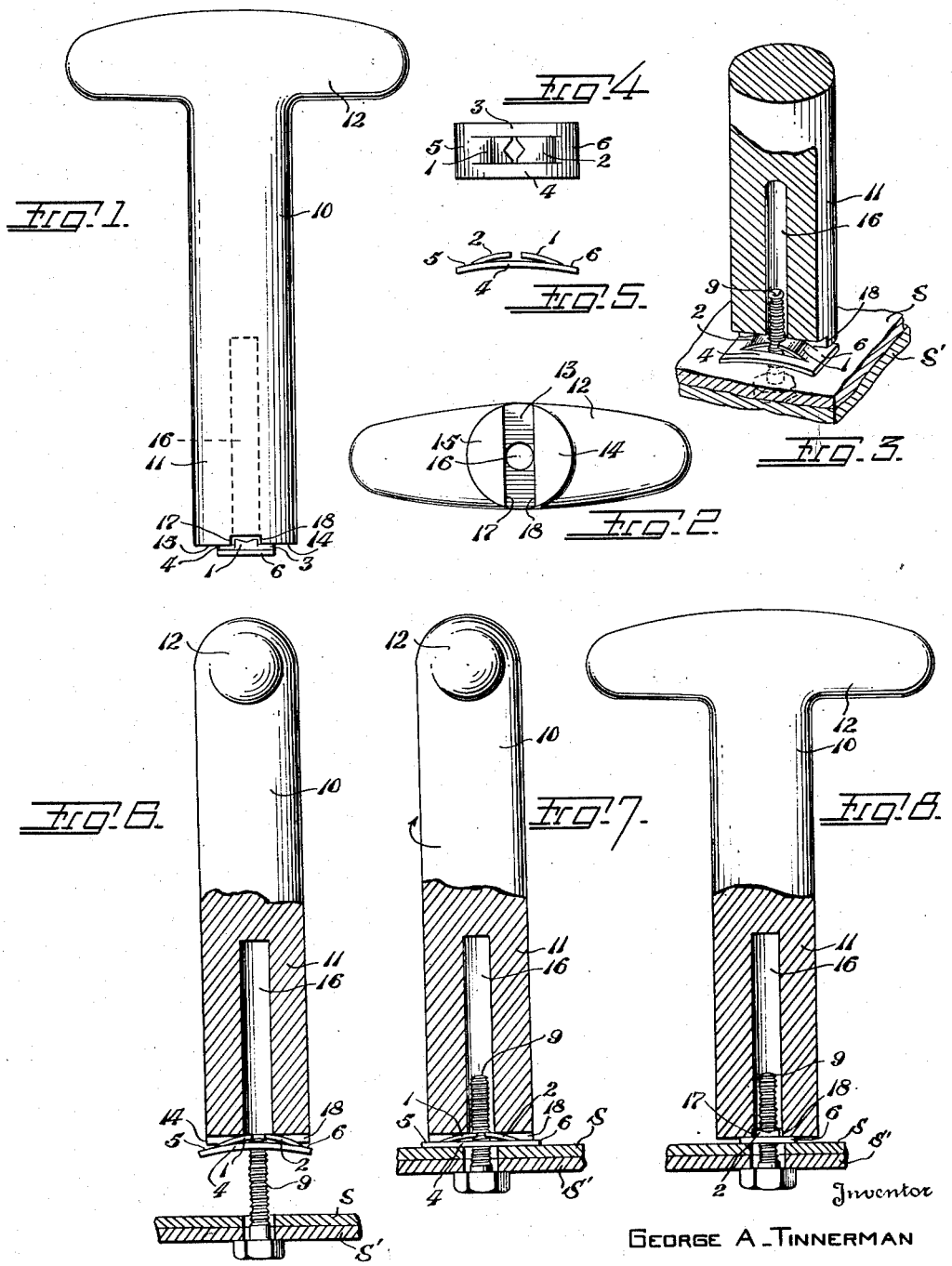
Inventor
GEORGE A. TINNERMAN
By H. G. Lombard,
Attorney Patented Nov. 22, 1938

2,137,929

UNITED STATES PATENT OFFICE 2,137,929

TOOL

George A. Tinnerman, Rocky River, Ohio, assignor to Albert H. Tinnerman, Cleveland, Ohio Application August 31, 1937, Serial No. 161,857

2 Claims. (Cl. 81—3)

This invention deals with an improved tool means for use with sheet metal or spring nut devices for applying the same to locked fastening engagement on a threaded bolt or stud.

An example of such tools is shown in a copending application Serial Number 156,786, filed July 31, 1937, and since issued as Patent Number 2,111,106, March 15, 1938.

More particularly, this invention relates to a tool for use with sheet metal or spring nut devices for easily and quickly advancing the same to fastening position on a bolt or stud in a substantial axial thrust and positively locking the devices in such fastening position in providing a rigid, tight, installation.

Sheet metal or threadless nut devices with which the tool of the instant invention is employed are constructed of a relatively thin section of sheet metal or heat-treated, tempered, spring steel from which tongues or similar bolt engaging means are deformed to project out of the plane thereof to engage the threads of the bolt or the shank of the stud under tension. Certain forms of such nut devices comprise end and bridge portions presenting a generally concave base with the tongues projecting upwardly therefrom between the bridge portions. Due to the inherent resiliency of the metal and the manner in which the tongues are provided, such nut devices are capable of a quick, easy assembly onto the bolts in a substantial axial thrust, ratchet-like action of the tongues with the cooperating shank element. However, on being so applied, in order to provide a locked, rigid fastening engagement preventing accidental loosening, it is necessary to subject the nut device to a tensioning operation, which, in the case of a threaded bolt, disposes the tongues of the nut device into tensioned fastening engagement with the lowermost effective thread of a bolt and, in the case of a threadless stud, causes the extremities of the tongues to dig into and become embedded in the shank of the stud and thus locked in applied fastening position.

It has heretofore been attempted to obtain such tensioned fastening engagement of the nut devices with the bolts, after the initial attachment, by the use of a tool in the form of a substantial yoke member comprising a pair of arms which contact the spring tongues on either side of the bolt to force them, in a ratchet-like action, to fastening engagement with the lowermost thread of the bolt. In practice, this procedure has been found inexpedient in that the tongues of the spring nuts do not tend to snap freely over the threads of the bolt or screw, and also, in that the tongues necessarily are deformed upwardly in concave, bowed relation relative to the base of the nut to the extent that the extremities thereof are disposed out of most effective contact with the bolt threads, and therefore, most often tend to slip over or climb into the next thread under strain and vibration of the parts secured, thereby rendering the nut device inefficient and loose in fastening engagement on the bolt.

In another application spring nuts provided with yieldable tongues are employed with threadless shank elements such as nails or rivets. And it has been found that any substantial pressure exerted on the tongues of the nut devices prevents the same from being advanced to tightened, fastening engagement against the work since such pressure prevents the tongues from yielding sufficient to permit the extremities thereof to slide easily on the threadless shank to the position of most effective fastening engagement.

The tool of the instant invention is admirably suited for any known application of a threadless sheet metal nut, or the like, comprising yieldable tongues or similar bolt engaging means, inasmuch as the basic concept involved is founded upon the feature of advancing a nut device to locked fastening engagement on a bolt or stud by substantial pressure applied to portions of the nut device other than the tongues or similar bolt engaging means in order that the tongues be disposed on the bolt or stud without being deformed or mutilated out of most effective fastening engagement therewith.

When employed with a threaded bolt, after the initial attachment of a nut device to fastening engagement by axial thrust, the locking action with the lowermost effective thread of the bolt is obtained by relative turning movement, thereby tensioning the tongues to locked fastening engagement and drawing the bolt axially to provide a tight, rigid installation. In the case of a threadless stud, the pressure on the nut device is applied, more particularly, at points other than the tongues; this serves to store tension in the base of the nut device in fastening position by flattening the bridge portions thereof, such that upon removal of the tool and withdrawal of pressure from the flattened bridge portions, the nut device attempts to assume its normal, untensioned configuration causing the extremities of the tongues to move toward each other to become embedded in the shank of the stud in locked relation thereto.

It is therefore a primary object of this invention to provide a tool for use with sheet metal or spring nut devices, and the like, comprising a tool-head member designed for readily fitting onto the nut devices and quickly advancing the same to most effective locked fastening engagement with a cooperating threaded bolt or screw, or threadless shank such as a nail or rivet.

Another principal purpose of the present invention is to provide a tool adapted for use in easily and quickly advancing a nut device to locked fastening engagement on a threaded bolt or screw, without stripping the threads thereof or deforming the bolt engaging means of the nut device out of uniform threaded engagement therewith.

A still further object of the invention contemplates the provision of a tool provided with a head member designed to readily fit onto a nut device for advancing the same to fastening engagement on a threaded bolt or screw in a substantial axial thrust, and having means engageable with elements of the nut device providing for relative turning movement thereof to tensioned relation in locked fastening engagement with the lowermost effective thread of the bolt.

Further objects and advantages of the invention will be apparent to those skilled in the art as a description thereof proceeds with reference to the accompanying drawing in which like reference characters designate like parts throughout the same, and in which:

Fig. 1 is a side elevation of the improved tool shown fitted to a sheet metal nut device for application to a threaded bolt or stud;

Fig. 2 is a bottom plan view of Fig. 1 showing in detail the head elements of the improved tool;

Fig. 3 is a perspective of a vertical section through the tool head shown fitted to elements such as the tongues of the nut device for advancing the same to locked fastening engagement on a threaded bolt;

Fig. 4 is a plan, and Fig. 5 is an edge elevation of a form of nut device with which the tool of the instant invention may be employed;

Fig. 6 is an end elevation of the improved tool with the head thereof shown in section, illustrating the application of a nut device to a threaded bolt by direct axial thrust;

Fig. 7 is a similar view showing the nut device as applied to fastening position flush with the adjacent face of the work; and, Fig. 8 shows the tool, with the head in section, as rotated substantially ninety degrees to dispose the tongues of the nut device in tensioned relation in locked fastening engagement with the lowermost effective thread of the bolt.

Referring now more particularly to the accompanying drawing, Figs. 1, 2, and 3 show a preferred embodiment of the invention in the form of a hand tool comprising a body member 10, a head member 11, at one end, and a handle 12 at the opposite end suitably designed for readily fitting in the palm of the hand. Both the head and handle members may be provided as integral parts of the tool, as shown, or designed in the form of separate members having screw threaded engagement with the body member. In any event, the head member is recessed as at 13, Fig. 2, to provide head elements 14, 15 presenting shoulders 17, 18, of such spacing as to receive between them the tongues or similar bolt engaging elements of the nut device. A bore 16 extending into the body of the tool is of sufficient depth to clear the stud to which the nut device is applied as shown in Fig. 3, and merges with recess 13. Thus, the bore 16 together with recess 13 presenting shoulders 17, 18, permits the tool head to be readily applied to an assembled nut device and bolt to provide for relative turning movement thereof as hereinafter more fully set forth.

Sheet metal or spring nut devices with which the tool of the present invention is employed are constructed from a relatively thin section of sheet metal, cold-rolled metal, spring steel, or the like. As shown in Figs. 4 and 5, one form of such nut devices may be obtained from a substantially rectangular section which is deformed to provide end portions 5, 6 and bridge portions 3, 4 between which integral yieldable tongues 1, 2 or similar bolt engaging means extend or project upwardly for engaging the shank of a stud or the threads of a bolt, as shown in Fig. 3. The said end and bridge portions provide what may be termed, the body of the nut, which body is so formed in the stamping operation as to present a normally untensioned, generally concave base from which the tongues extend upwardly in a substantial ogee formation with the extremities thereof so spaced as to lie on a helix corresponding to the pitch of the threads on the bolt fastening for uniform threaded engagement therewith. Thus, when the nut device is tightened on a bolt by flattening against an adjacent work surface, the end portions 5, 6, thereof are moved from their initial, normally untensioned position in the concave base outwardly and upwardly in a substantial lifting force which is transmitted to the tongues 1, 2, to urge the same inwardly whereby the extremities of said tongues are caused to dig into and become embedded in the threads in locked fastening engagement therewith. At the same time, the bowed bridge portions 3, 4, are elongated such that the generally concave base assumes a position of a substantially thin, flat section Fig. 8, disposed in close proximity to the adjacent work surface, whereby the nut device is anchored with no parts projecting sufficient to be engageable by a conventional tool, and accordingly, cannot be readily removed except by a special tool by authorized persons.

From the foregoing, it will be understood that the bending moment which serves to lock the nut device on a threaded bolt in applied position is produced by the downward pressure of the engaged bolt thread with the extremities of the tongues, and the upward reaction pressure supplied to the tongues by the tensioned bridge and end portions in the flattened base in attempting to assume its initial, normally untensioned, concave configuration.

In the use of the tool of the instant invention, a rigid, tight installation is ensured and there is no tendency of the tongues of the nut devices slipping or loosening from fastening position since the pressure for advancing the nut devices to fastening engagement is applied more directly to the bridge and end portions to flatten the same and thereby tension the base without deforming the tongue elements thereof out of their essential ogee formation which affords the most effective fastening engagement. Thus when a nut device is applied to a threaded bolt or screw by the tool of the instant invention, the tongues or similar bolt engaging means are, disposed in fastening position with the last effective thread on the bolt, whereupon the tool is given a substantial quarter turn, drawing the bolt axially and tensioning the base, thereby causing the tongues to become embedded in the threads of the bolt in locked fastening engagement therewith. In the application of a nut device to a threadless stud, pressure is likewise applied more directly to the bridge portions thereof to flatten the generally concave base against the adjacent work surface without deforming the tongues; and thus when the tool is withdrawn and the attendant pressure removed from the flattened bridge portions, the tension stored therein causes the tongues to move inwardly to become embedded in the shank by substantial line contact thereby ensuring a positive locking action at all times. At the same time, an axial force is exerted on the stud by the generally concave base of the nut device in attempting to assume its normal, untensioned configuration, such that the assembly not only is locked in applied position, but the member secured thereby is rigidly and tightly maintained in the installation.

From the foregoing, it will be understood that, in operation, spring nuts or sheet metal nut devices in the initial attachment to their cooperating shank elements, are placed upon the bolts by the operator as in Fig. 6, and advanced in an easy, quick attachment by simple, direct axial thrust applied thereto by the tool to the position substantially flush with the adjacent surface of the work substantially as shown in Fig. 7. In this operation, the nut device is fitted to the tool head as shown in Fig. 6 with the tongues 1, 2, disposed in the recess 13 and the elements 14, 15 in contact with the bridge portions 3, 4, such that the lateral edges of the tongues are in snug engagement with the shoulders 17, 18. See Figs. 1 and 3. The recess 13 is of suitable depth to fully receive and clear the tongue elements in any position and inasmuch as the extremities thereof are yieldable, they are capable of a substantial sliding, rachet-like action with the bolt threads to the fastening position shown in Fig. 7, without deforming the tongues out of their essential ogee formation, thus reducing considerably the time required for initially attaching the nuts onto the bolts in uniform threaded engagement with the bolt threads by a conventional rotating action. After the nut device has been thus applied to its respective cooperating bolt substantially to the position shown in Fig. 7, the handle 12 of the tool is given an approximate quarter-turn whereupon the shoulders 17, 18, in engagement with the lateral edges of the tongues, effect a rotating movement of the nut device substantially to the position shown in Fig. 8. This action necessarily tensions the base of the nut device and disposes the tongues in uniform threaded engagement with the lowermost effective thread of the bolt causing the extremities of the tongues to dig into and become embedded in the bolt shank in locked relation thereto; at the same time the bolt is drawn axially such that the parts S, S', secured thereby, are tightened and thus maintained rigidly in applied fastening position.

In the application of a sheet metal nut device to a threadless stud, the head elements 14, 15, in contact with the bridge portions 3, 4, of the nut device cause the generally concave base thereof to become flattened and thereby tensioned in desired fastening position. And when the tool is withdrawn and attendant pressure removed from the bridge portions the nut device naturally tends to assume its initial, normally untensioned, generally concave configuration, and in so doing urges the tongue elements inwardly toward each other and causes the same to become embedded in locked fastening engagement with the threadless bolt or stud. Simultaneously, a certain amount of axial pull is exerted by the nut device on the bolt or stud in the assembly thereby drawing the same axially and ensuring a rigid, tight installation at all times.

Though the thread engaging elements of the nut devices are shown and described as comprising cooperating yieldable tongues, other equivalent forms of stud and bolt engaging means in similar nut devices may be effectively applied by the tool of the instant invention to fastening engagement onto a threadless shank, shouldered stud, or conventional threaded bolt.

And while the tool of the instant invention has been described in detail with specific examples, such examples are illustrative only since it will be apparent to those skilled in the art that other modifications within the spirit and scope of the invention may be constructed without departing from the teachings or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. For applying a sheet metal nut device having projecting bolt engaging means to fastening engagement on a cooperating bolt or stud, a tool head having a recess extending transversely thereto to provide spaced head elements and having a bore communicating with said recess, the bore being adapted to receive the bolt or stud therein, said head elements forming spaced shoulders straddling said bolt engaging means and being in substantial abutting relation therewith, said recess being of suitable depth to clear said projecting bolt engaging means, whereby said head elements may be fitted to a nut device to engage the base thereof for advancing the same to fastening position on a supported bolt or stud without deforming the bolt engaging means out of most effective engagement with the bolt or stud, said abutting relation of the shoulders of said head elements with the projecting bolt engaging means providing for turning movement of the nut device in such applied fastening position.

2. For applying a sheet metal nut device having projecting bolt engaging means to fastening engagement on a cooperating bolt or stud, a tool head having a recess extending transversely thereto to provide spaced head elements forming spaced shoulders for engaging said projecting bolt engaging means of the nut device upon turning movement of the tool head, said head elements being spaced apart a distance sufficient to straddle said projecting bolt engaging means with said shoulders in substantial abutting relation therewith, said recess being of suitable depth to clear said projecting bolt engaging means, whereby said head elements may be fitted to a nut device to engage the base thereof for advancing the same to fastening position on a supported bolt or stud without deforming the bolt engaging means out of most effective engagement with the bolt or stud, said substantial abutting relation of the shoulders of said head elements with the projecting bolt engaging means providing for turning movement of the nut device in such applied fastening position.

GEORGE A. TINNERMAN.